United States Patent
Cheong et al.

(10) Patent No.: US 10,873,747 B2
(45) Date of Patent: Dec. 22, 2020

(54) RESIDUAL MAPPING METHOD FOR IMAGE/VIDEO COMPRESSION

(71) Applicant: Sony Corporation, Tokyo (JP)

(72) Inventors: Hye-Yeon Cheong, Los Gatos, CA (US); Ali Tabatabai, Cupertino, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/194,355

(22) Filed: Nov. 18, 2018

(65) Prior Publication Data

US 2020/0162734 A1 May 21, 2020

(51) Int. Cl.
*H04N 19/124* (2014.01)
*H04N 19/176* (2014.01)
*H04N 19/91* (2014.01)

(52) U.S. Cl.
CPC ......... *H04N 19/124* (2014.11); *H04N 19/176* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 7,738,714 B2 | 6/2010 | Lee et al. | |
| 8,275,045 B2 | 9/2012 | Ye et al. | |
| 9,219,912 B2 | 12/2015 | He et al. | |
| 9,380,303 B1* | 6/2016 | Eslami | H04N 19/13 |
| 2004/0234144 A1* | 11/2004 | Sugimoto | H04N 19/176 382/239 |
| 2014/0286413 A1* | 9/2014 | Joshi | H04N 19/70 375/240.12 |
| 2019/0222845 A1* | 7/2019 | Taubman | H04N 19/129 |

* cited by examiner

*Primary Examiner* — Kate H Luo
(74) *Attorney, Agent, or Firm* — Haverstock & Owens LLP

(57) ABSTRACT

To improve encoding efficiency, residual values are mapped so that only non-negative values are utilized when performing the encoding process.

17 Claims, 4 Drawing Sheets

| | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| Conventional | Supporting all range | | | | | | | | | | | | | | |
| Predictor = 0 | | | | | | | | 0 | 1 | 2 | 3 | 4 | 5 | 6 | 7 |
| Predictor = 1 | | | | | | | 2 | 0 | 1 | 3 | 4 | 5 | 6 | 7 | |
| Predictor = 2 | | | | | | 4 | 2 | 0 | 1 | 3 | 5 | 6 | 7 | | |
| Predictor = 3 | | | | | 6 | 4 | 2 | 0 | 1 | 3 | 5 | 7 | | | |
| Predictor = 4 | | | | 7 | 6 | 4 | 2 | 0 | 1 | 3 | 5 | | | | |
| Predictor = 5 | | | 7 | 6 | 5 | 4 | 2 | 0 | 1 | 3 | | | | | |
| Predictor = 6 | | 7 | 6 | 5 | 4 | 3 | 2 | 0 | 1 | | | | | | |
| Predictor = 7 | 7 | 6 | 5 | 4 | 3 | 2 | 1 | 0 | | | | | | | |

|  | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| Conventional | Supporting all range ||||||||||||||
| Predictor = 0 |  |  |  |  |  |  |  | Valid residual range ||||||||
| Predictor = 1 |  |  |  |  |  |  | Valid residual range |||||||||
| Predictor = 2 |  |  |  |  |  | Valid residual range ||||||||||
| Predictor = 3 |  |  |  |  | Valid residual range |||||||||||
| Predictor = 4 |  |  |  | Valid residual range ||||||||||||
| Predictor = 5 |  |  | Valid residual range |||||||||||||
| Predictor = 6 |  | Valid residual range ||||||||||||||
| Predictor = 7 | Valid residual range |||||||||||||||

Fig. 1

|  | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| Conventional | Supporting all range ||||||||||||||
| Predictor = 0 |  |  |  |  |  |  |  | 0 | 1 | 2 | 3 | 4 | 5 | 6 | 7 |
| Predictor = 1 |  |  |  |  |  |  | 2 | 0 | 1 | 3 | 4 | 5 | 6 | 7 |  |
| Predictor = 2 |  |  |  |  |  | 4 | 2 | 0 | 1 | 3 | 5 | 6 | 7 |  |  |
| Predictor = 3 |  |  |  |  | 6 | 4 | 2 | 0 | 1 | 3 | 5 | 7 |  |  |  |
| Predictor = 4 |  |  |  | 7 | 6 | 4 | 2 | 0 | 1 | 3 | 5 |  |  |  |  |
| Predictor = 5 |  |  | 7 | 6 | 5 | 4 | 2 | 0 | 1 | 3 |  |  |  |  |  |
| Predictor = 6 |  | 7 | 6 | 5 | 4 | 3 | 2 | 0 | 1 |  |  |  |  |  |  |
| Predictor = 7 | 7 | 6 | 5 | 4 | 3 | 2 | 1 | 0 |  |  |  |  |  |  |  |

Fig. 2

RESIDUAL MAPPING METHOD FOR IMAGE/VIDEO COMPRESSION

FIELD OF THE INVENTION

The present invention relates to video coding. More specifically, the present invention relates to image/video compression.

BACKGROUND OF THE INVENTION

Video coding includes quantization, Differential Pulse-Code Modulation (DPCM), entropy coding and refinement. Entropy coding is a lossless data compression scheme which compresses data by replacing each fixed-length input symbol with the corresponding variable-length prefix-free output codeword.

SUMMARY OF THE INVENTION

To improve encoding efficiency, residual values are mapped so that only non-negative values are utilized when performing the encoding process.

In one aspect, a method programmed in a non-transitory memory of a device comprises mapping residual values from including negative residual values to only including non-negative residual values and encoding content using the non-negative residual values. The method further comprises receiving the content, quantizing an image block of the content, utilizing a modulation to digitally represent signals using prediction, and refining the content after encoding the content. Mapping the residual values includes minimizing a distance from zero for the non-negative residual values. Mapping the residual values includes mapping zero to zero, and then alternating mapping a positive residual value to a next non-negative residual value and mapping a negative residual value to the next non-negative residual value. The residual values are mapped to values 0 to $2^{depth}-1$, where depth is a bit-depth. Encoding the content using the non-negative residual values includes utilizing a variable length coding table configured to support only non-negative residual values. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.

In another aspect, an apparatus comprises a non-transitory memory for storing an application, the application for: mapping residual values from including negative residual values to only including non-negative residual values and encoding content using the non-negative residual values, a processor coupled to the memory, the processor configured for processing the application. The application is further for: receiving the content, quantizing an image block of the content, utilizing a modulation to digitally represent signals using prediction, and refining the content after encoding the content. Mapping the residual values includes minimizing a distance from zero for the non-negative residual values. Mapping the residual values includes mapping zero to zero, and then alternating mapping a positive residual value to a next non-negative residual value and mapping a negative residual value to the next non-negative residual value. The residual values are mapped to values 0 to $2^{depth}-1$, where depth is a bit-depth. Encoding the content using the non-negative residual values includes utilizing a variable length coding table configured to support only non-negative residual values. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.

In another aspect, a system comprises a first computing device configured for: mapping residual values from including negative residual values to only including non-negative residual values and encoding content using the non-negative residual values and a second computing device configured for: decoding the encoded content. The first computing device is further for: receiving the content, quantizing an image block of the content, utilizing a modulation to digitally represent signals using prediction, and refining the content after encoding the content. Mapping the residual values includes minimizing a distance from zero for the non-negative residual values. Mapping the residual values includes mapping zero to zero, and then alternating mapping a positive residual value to a next non-negative residual value and mapping a negative residual value to the next non-negative residual value. The residual values are mapped to values 0 to $2^{depth}-1$, where depth is a bit-depth. Encoding the content using the non-negative residual values includes utilizing a variable length coding table configured to support only non-negative residual values.

BRIEF DESCRIPTION OF THE DRAWINGS

FIG. 1 illustrates a diagram of entropy coding which supports residual values of all ranges according to some embodiments.

FIG. 2 illustrates a diagram of entropy coding which supports only non-negative residual values according to some embodiments.

DETAILED DESCRIPTION OF THE PREFERRED EMBODIMENT

To improve a coder/decoder ("codec"), entropy coding is optimized by mapping residual values to be non-negative. Entropy coding is binarization utilized to compress data, and the compression is able to be performed block by block. For example, a 16×2 image block is encoded such that the result includes header bits, entropy coded bits and refinement bits.

As is known for codecs, an encoder performs prediction, transform and encoding steps to generate a compressed bitstream, and a decoder implements decoding, inverse transform and reconstruction to generate a decoded video (or other content). During prediction, the encoder processes a frame of a video (a macroblock), to generate a prediction of the macroblock based on previously coded data. The encoder subtracts the prediction from the current macroblock to determine a residual.

FIG. 1 illustrates a diagram of entropy coding which supports residual values of all ranges according to some embodiments. Depending on the predictor value, the actual valid range of the residual values is half of the size. For example, when the bit-depth equals 3, then the sample value is between 0 and 7, inclusive.

FIG. 2 illustrates a diagram of entropy coding which supports only non-negative residual values according to some embodiments. The residuals are mapped to 0 to $2^{depth}-1$. For example, if the depth is 3, then the residuals are mapped to 0 to 7. As shown in the Figure, the mapping attempts to minimize the distance from zero for each mapping. For example, for predictor equal to 1, which includes residual values −1 to 6, the residual of −1 corresponds to 2. In another example, when the predictor equals 3, then 0 is still mapped to 0, 1 is still mapped to 1, but −1 is mapped to 2, 2 is mapped to 3, −2 is mapped to 4, 3 is mapped to 5, −3 is mapped to 6 and 4 is mapped to 7. In other words, mapping the residual values includes mapping zero to zero, and then alternating mapping a positive residual value to the next non-negative residual value (e.g., +1 is mapped to 1) and mapping a negative residual value to the next non-negative residual value (e.g., −1 is mapped to 2). In some embodiments, the predictor is non-negative also. In some embodiments, the Variable Length Coding (VLC) table is designed to support only non-negative input.

Although FIGS. 1 and 2 show examples of a bit-depth of 3, any bit-depth is able to be implemented. Other mapping schemes are able to be implemented.

Figure 3:
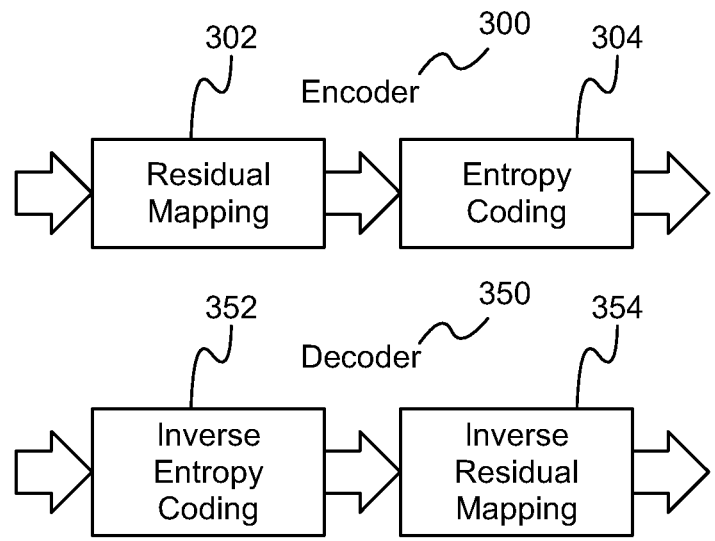
FIG. 3 illustrates diagrams of an encoder and a decoder implementing the residual mapping method according to some embodiments.

FIG. 3 illustrates diagrams of an encoder and a decoder implementing the residual mapping method according to some embodiments. At the encoder 300, residual mapping 302 is implemented, and then entropy coding 304 utilizes the residual mapping information to perform more efficient coding of content. At the decoder 350, inverse entropy coding 352 is utilized to decode the encoded content, and then inverse residual mapping 354 is implemented. In some embodiments, the encoder 300 and decoder 350 have other components, for example standard codec components. Exemplary code of the encoder 300 and decoder 350 is described herein:

```
// Residual Mapping Encoder
MaxV = 1<<depth;
PP = min (predictor, abs(MaxV − 1 − predictor));
if (resq != 0) {
    absR = abs(resq);
    resq = (absR<=PP) ? (absR−1)<<1+1+(resq<0) : absR+PP;
}
// Residual Mapping Decoder
MaxV = 1<<depth;
#define signC(a,b) ((b==1) ? a:−a)
PP = min (predictor, abs(MaxV − 1 − predictor));
LSB = bitget(resq,1);
resq = (resq>(PP<<1)) ? ...
    signC(resq−PP, predictor==PP):signC((resq>>1)+LSB, LSB);
}
```

Figure 4:
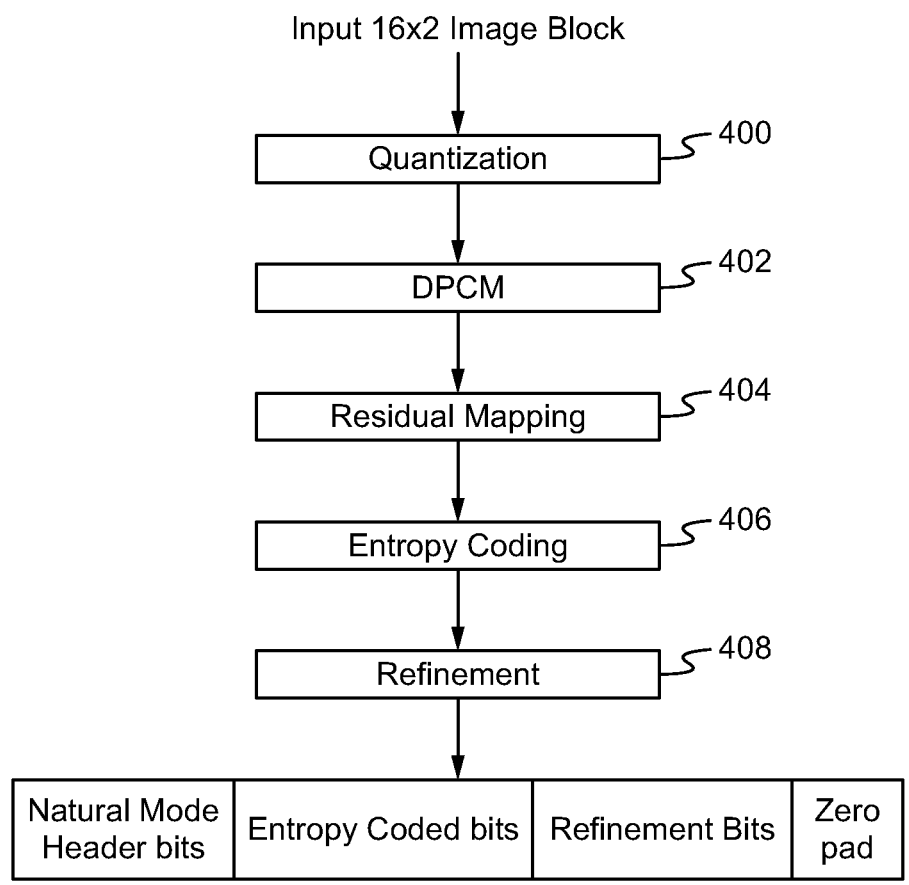
FIG. 4 illustrates a flowchart of a method of implementing a codec according to some embodiments.

FIG. 4 illustrates a flowchart of a method of implementing a codec according to some embodiments. An image block (e.g., a 16×2 input image block) is quantized in the step 400. Quantization is a lossy compression technique by compressing a range of values to a single quantum value. In the step of 402, Differential Pulse-Code Modulation (DPCM) is utilized to digitally represent sampled signals using prediction. In the step 404, residual mapping is implemented as described herein. In the step 406, entropy coding is implemented to compress the data. In the step 406, the compressed data is refined. After refinement, an encoded bitstream is available, including header bits, entropy coded bits and refinement bits. Inverse steps to decode the compressed data are also able to be implemented. In some embodiments, fewer or additional steps are implemented. For example, a step of acquiring (e.g., downloading) or capturing (e.g., taking a picture) content occurs before the video encoding process. In some embodiments, the order of the steps is modified.

Figure 5:
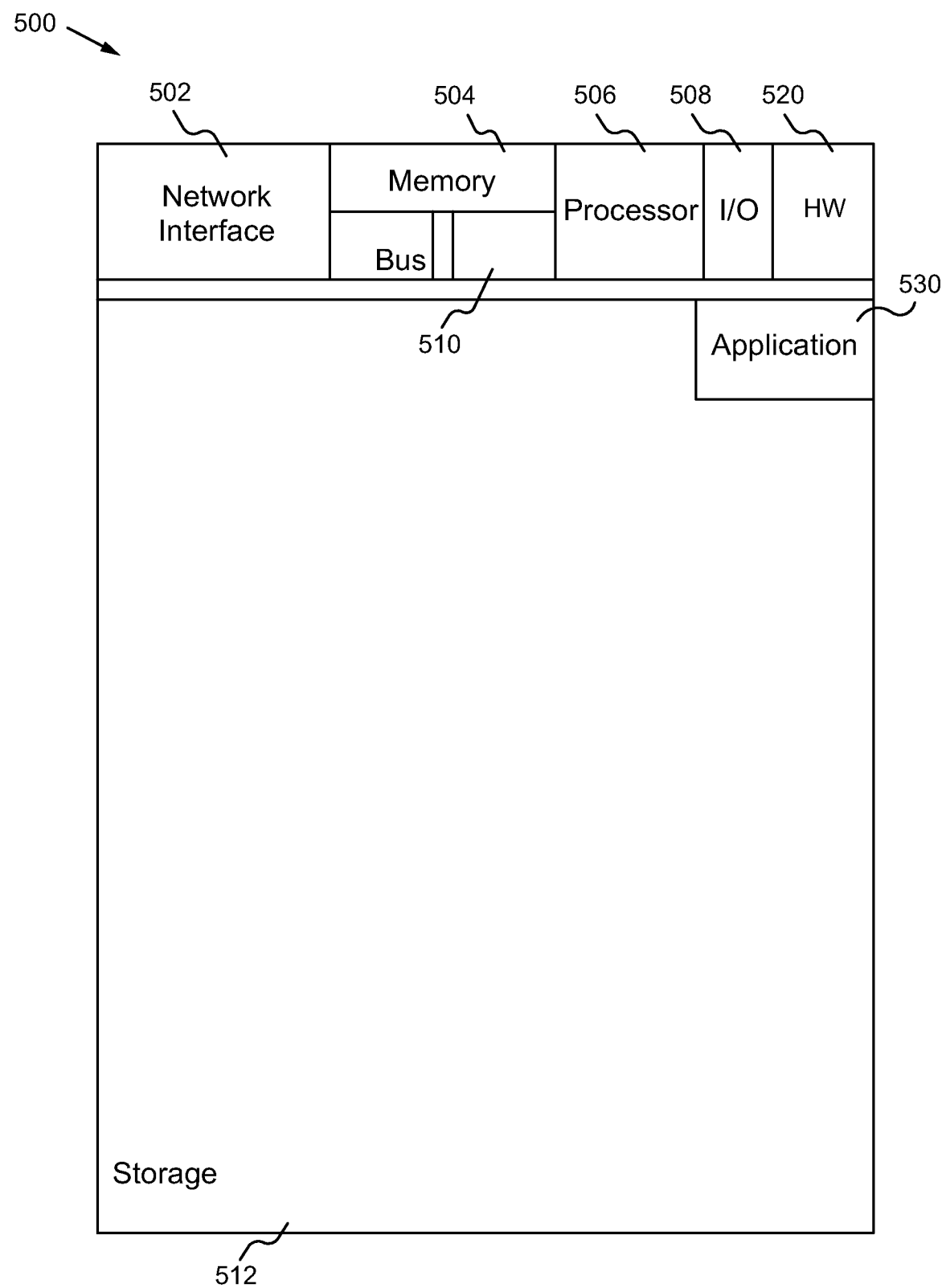
FIG. 5 illustrates a block diagram of an exemplary computing device configured to implement the residual mapping method according to some embodiments.

FIG. 5 illustrates a block diagram of an exemplary computing device configured to implement the residual mapping method according to some embodiments. The computing device 500 is able to be used to acquire, store, compute, process, communicate and/or display information such as images and videos. The computing device 500 is able to implement any of the residual mapping method aspects such as encoding and/or decoding. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Residual mapping application(s) 530 used to implement the residual mapping method are likely to be stored in the storage device 512 and memory 504 and processed as applications are typically processed. More or fewer components shown in FIG. 5 are able to be included in the computing device 500. In some embodiments, residual mapping hardware 520 is included. Although the computing device 500 in FIG. 5 includes applications 530 and hardware 520 for the residual mapping method, the residual mapping method is able to be implemented on a computing device in hardware, firmware, software or any combination thereof. For example, in some embodiments, the residual mapping applications 530 are programmed in a memory and executed using a processor. In another example, in some embodiments, the residual mapping hardware 520 is programmed hardware logic including gates specifically designed to implement the residual mapping method.

In some embodiments, the residual mapping application(s) 530 include several applications and/or modules. In some embodiments, modules include one or more sub-modules as well. In some embodiments, fewer or additional modules are able to be included.

In some embodiments, the residual mapping hardware 520 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 6:
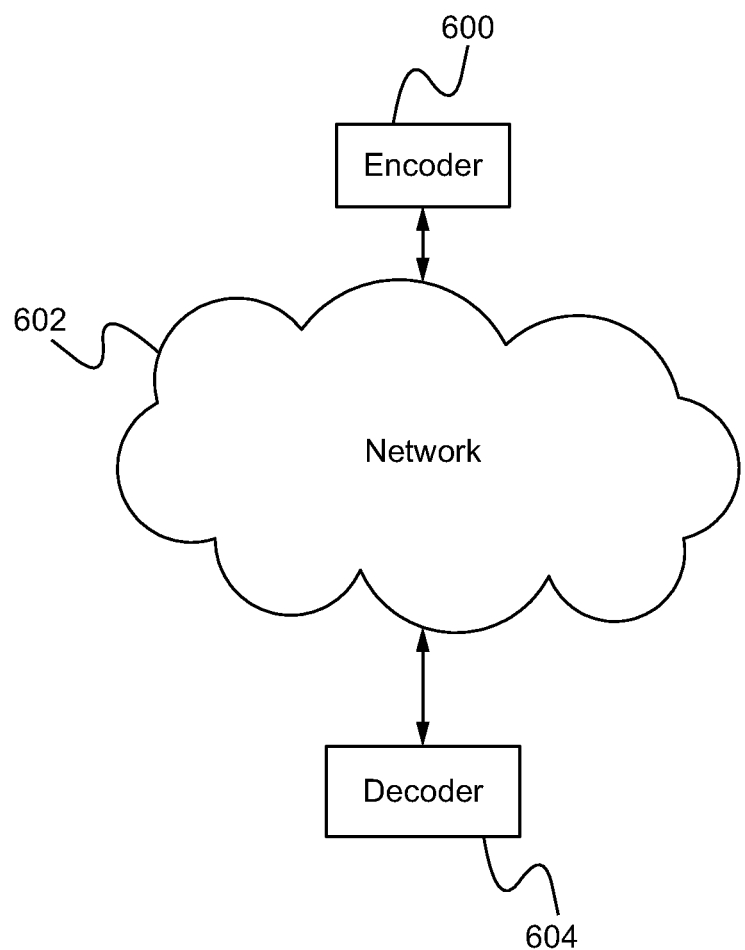
FIG. 6 illustrates a diagram of a network of devices according to some embodiments.

FIG. 6 illustrates a diagram of a network of devices according to some embodiments. Video content is encoded at one or more encoder devices 600. The encoded content is transmitted/streamed through a network 602 (e.g., the Internet, a cellular network or any other network) to one or more decoder devices 604. In some embodiments, the content is transmitted to the one or more decoder devices 604 directly without a network. The one or more devices of the network of devices (e.g., encoder device, decoder device) are configured to perform the residual mapping method described herein. The one or more encoder devices 600 and the one or more decoder devices 604 are able to be any device such as servers, a personal computers, smart phones, televisions, gaming systems, vehicles or any of the devices described herein or any combination of devices described herein.

To utilize the residual mapping method described herein, devices such as digital cameras/camcorders are used to acquire content. The residual mapping method is able to be implemented with user assistance or automatically without user involvement to efficiently encode, transmit, and decode content.

In operation, the residual mapping method more efficiently encodes and decodes content. Specifically, by mapping the residual values to non-negative numbers, then the encoder does not need to handle negative numbers. Specifically, a VLC table is able to be implemented where the VLC table does not have to address negative numbers. By focusing on non-negative numbers, bit counts are able to be reduced, and image/video processing is able to be improved (e.g., faster/more efficient).

Some Embodiments of Residual Mapping Method for Image/Video Compression

1. A method programmed in a non-transitory memory of a device comprising:
   mapping residual values from including negative residual values to only including non-negative residual values; and
   encoding content using the non-negative residual values.
2. The method of clause 1 further comprising receiving the content, quantizing an image block of the content, utilizing a modulation to digitally represent signals using prediction, and refining the content after encoding the content.
3. The method of clause 1 wherein mapping the residual values includes minimizing a distance from zero for the non-negative residual values.
4. The method of clause 1 wherein mapping the residual values includes mapping zero to zero, and then alternating mapping a positive residual value to a next non-negative residual value and mapping a negative residual value to the next non-negative residual value.
5. The method of clause 1 wherein the residual values are mapped to values 0 to $2^{depth}-1$, where depth is a bit-depth.
6. The method of clause 1 wherein encoding the content using the non-negative residual values includes utilizing a variable length coding table configured to support only non-negative residual values.
7. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.
8. An apparatus comprising:
   a non-transitory memory for storing an application, the application for:
      mapping residual values from including negative residual values to only including non-negative residual values; and
      encoding content using the non-negative residual values;
   a processor coupled to the memory, the processor configured for processing the application.
9. The apparatus of clause 8 wherein the application is further for: receiving the content, quantizing an image block of the content, utilizing a modulation to digitally represent signals using prediction, and refining the content after encoding the content.
10. The apparatus of clause 8 wherein mapping the residual values includes minimizing a distance from zero for the non-negative residual values.
11. The apparatus of clause 8 wherein mapping the residual values includes mapping zero to zero, and then alternating mapping a positive residual value to a next non-negative residual value and mapping a negative residual value to the next non-negative residual value.
12. The apparatus of clause 8 wherein the residual values are mapped to values 0 to $2^{depth}-1$, where depth is a bit-depth.
13. The apparatus of clause 8 wherein encoding the content using the non-negative residual values includes utilizing a variable length coding table configured to support only non-negative residual values.
14. The apparatus of clause 8 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.
15. A system comprising:
   a first computing device configured for:
      mapping residual values from including negative residual values to only including non-negative residual values; and
      encoding content using the non-negative residual values; and
   a second computing device configured for:
      decoding the encoded content.
16. The system of clause 15 wherein the first computing device is further for: receiving the content, quantizing an image block of the content, utilizing a modulation to digitally represent signals using prediction, and refining the content after encoding the content.
17. The system of clause 15 wherein mapping the residual values includes minimizing a distance from zero for the non-negative residual values.

18. The system of clause 15 wherein mapping the residual values includes mapping zero to zero, and then alternating mapping a positive residual value to a next non-negative residual value and mapping a negative residual value to the next non-negative residual value.

19. The system of clause 15 wherein the residual values are mapped to values 0 to $2^{depth}-1$, where depth is a bit-depth.

20. The system of clause 15 wherein encoding the content using the non-negative residual values includes utilizing a variable length coding table configured to support only non-negative residual values.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   mapping residual values from including negative residual values to only including non-negative residual values, wherein mapping the residual values includes mapping zero to zero, and mapping a first positive residual value with a first distance closest to zero to a first non-negative residual value, mapping a first negative residual value with the first distance to a second non-negative residual value, which is greater than the first non-negative residual value, continuing mapping all residual values by alternating positive residual values and negative residual values and increasing their distance; and
   encoding content using the non-negative residual values.

2. The method of claim 1 further comprising receiving the content, quantizing an image block of the content, utilizing a modulation to digitally represent signals using prediction, and refining the content after encoding the content.

3. The method of claim 1 wherein mapping the residual values includes minimizing a distance from zero for the non-negative residual values.

4. The method of claim 1 wherein the residual values are mapped to values 0 to $2^{depth}-1$, where depth is a bit-depth.

5. The method of claim 1 wherein encoding the content using the non-negative residual values includes utilizing a variable length coding table configured to support only non-negative residual values.

6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.

7. An apparatus comprising:
   a non-transitory memory for storing an application, the application for:
      mapping residual values from including negative residual values to only including non-negative residual values, wherein mapping the residual values includes mapping zero to zero, and mapping a first positive residual value with a first distance closest to zero to a first non-negative residual value, mapping a first negative residual value with the first distance to a second non-negative residual value, which is greater than the first non-negative residual value, continuing mapping all residual values by alternating positive residual values and negative residual values and increasing their distance; and
      encoding content using the non-negative residual values;
   a processor coupled to the memory, the processor configured for processing the application.

8. The apparatus of claim 7 wherein the application is further for: receiving the content, quantizing an image block of the content, utilizing a modulation to digitally represent signals using prediction, and refining the content after encoding the content.

9. The apparatus of claim 7 wherein mapping the residual values includes minimizing a distance from zero for the non-negative residual values.

10. The apparatus of claim 7 wherein the residual values are mapped to values 0 to $2^{depth}-1$, where depth is a bit-depth.

11. The apparatus of claim 7 wherein encoding the content using the non-negative residual values includes utilizing a variable length coding table configured to support only non-negative residual values.

12. The apparatus of claim 7 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system, an augmented reality device, a virtual reality device, smart jewelry, and a vehicle.

13. A system comprising:
   a first computing device configured for:
      mapping residual values from including negative residual values to only including non-negative residual values, wherein mapping the residual values includes mapping zero to zero, and mapping a first positive residual value with a first distance closest to zero to a first non-negative residual value, mapping a first negative residual value with the first distance to a second non-negative residual value, which is greater than the first non-negative residual value, continuing mapping all residual values by alternating positive residual values and negative residual values and increasing their distance; and
      encoding content using the non-negative residual values; and
   a second computing device configured for:
      decoding the encoded content.

14. The system of claim 13 wherein the first computing device is further for: receiving the content, quantizing an image block of the content, utilizing a modulation to digitally represent signals using prediction, and refining the content after encoding the content.

15. The system of claim 13 wherein mapping the residual values includes minimizing a distance from zero for the non-negative residual values.

16. The system of claim 13 wherein the residual values are mapped to values 0 to $2^{depth}-1$, where depth is a bit-depth.

17. The system of claim 13 wherein encoding the content using the non-negative residual values includes utilizing a variable length coding table configured to support only non-negative residual values.

* * * * *